US006130920A

United States Patent [19]

Powell, II et al.

[11] Patent Number: 6,130,920

[45] Date of Patent: Oct. 10, 2000

[54] METHOD AND APPARATUS FOR ACCURATE SYNCHRONIZATION USING SYMBOL DECISION FEEDBACK

[75] Inventors: Clinton C. Powell, II, Lake Worth; Chun-Ye Chang, Boynton Beach; David L. Brown, Lake Worth; David F. Brown, Melbourne; Robert Karl Schweickert, Jupiter, all of Fla.

[73] Assignee: Motorola, Schaumburg, Ill.

[21] Appl. No.: 09/076,992

[22] Filed: May 13, 1998

[51] Int. Cl.[7] .................................................... H04L 27/06

[52] U.S. Cl. ........................................... 375/343; 375/355

[58] Field of Search .................................... 375/208, 341, 375/343, 344, 355, 367, 148, 149, 150

[56] References Cited

U.S. PATENT DOCUMENTS

| | | | |
|---|---|---|---|
| 5,208,833 | 5/1993 | Erhart et al. . | |
| 5,533,066 | 7/1996 | Yamaguchi et al. | 375/341 |
| 5,748,686 | 5/1998 | Langberg et al. | 375/367 |
| 5,751,774 | 5/1998 | Wang | 375/367 |
| 5,802,079 | 9/1998 | Wang | 375/365 |
| 5,838,774 | 11/1998 | Zheng | 375/355 |

*Primary Examiner*—Don Vo
*Attorney, Agent, or Firm*—Pablo Meles

[57] ABSTRACT

A circuit (12) for symbol decision directed feedback synchronization includes a current synchonization clock (45) that provides an initial sampling point and selects a detector corresponding to a current symbol decision. The circuit further includes a plurality of detectors (31, 32, 33, and 34) including the detector corresponding to the current symbol decision, a buffer (736) for storing the output of the detector corresponding to the current symbol decision and a processor (300) for seeking within a predetermined window about the initial sampling point for an optimum phase value to provide an adjustment signal which is used by the processor to adjust a subsequent symbol's sychronization clock to provide an optimal sampling point.

18 Claims, 5 Drawing Sheets

FIG. 9
FIG. 10
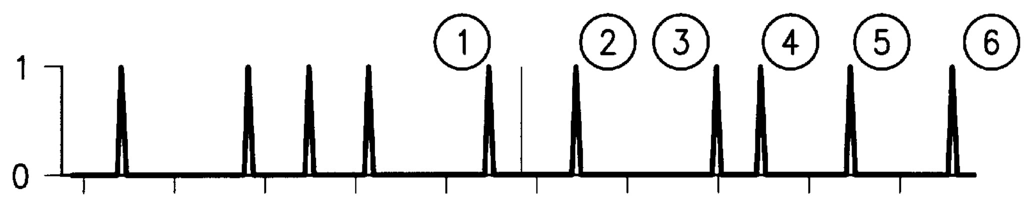
FIG. 11
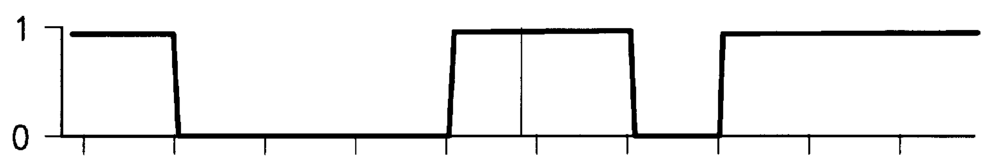
FIG. 12
FIG. 13
FIG. 14
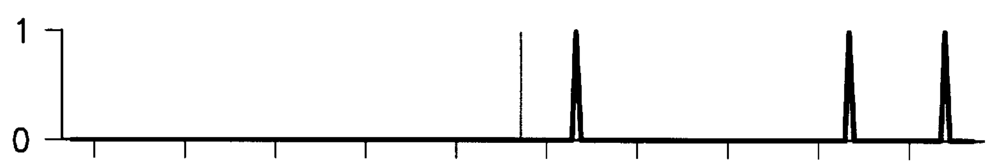
FIG. 15

METHOD AND APPARATUS FOR ACCURATE SYNCHRONIZATION USING SYMBOL DECISION FEEDBACK

FIELD OF THE INVENTION

The present invention is directed to a communication device, such as a selective call receiver, and more particularly to a communication device and method capable of accurately synchronizing by feeding back a symbol decision and corresponding phase information to a synchronizer.

BACKGROUND OF THE INVENTION

The Maximum Likelihood Detector which is also known as the Optimum Noncoherent Detector (or correlation detector) for detecting FSK signals in an additive white gaussian noise channel is well known. The performance of a correlation detector can also be achieved with other detector architectures such as a Matched Filter or a Fast Fourier Transform (FFT). However, the ability of these detectors to achieve a significant sensitivity improvement (i.e., 4 dB) over that of discriminators for 4-level orthogonal signalling (i.e. FLEX™) and a significant sensitivity improvement (i.e., 3 dB) for 4-level quasi-orthogonal signalling (i.e. ReFLEX™) depends greatly on the accuracy of the derived symbol synchronization. The output of the detector(s) is a discrete 4-level signal. Therefore standard edge detection or eye opening synchronization techniques can not be employed since they do not operate well at the lower sensitivity levels that are achievable by these optimum detectors. What is needed is a new synchronization technique that achieves performance greater than or equal to that of a hard wired clock and maintains the 4 dB and 3 dB improvements for FLEX™ and ReFLEX™ respectively. Furthermore, the new synchronization technique should provide for detectors for FLEX™ 4-level signalling in a static channel that have no phase performance imbalances.

BRIEF DESCRIPTION OF THE DRAWINGS

FIG. 9 is a timing diagram illustrating a sync clock in accordance with the present invention.

FIG. 10 is a timing diagram illustrating a sync clock with a half symbol delay in accordance with the present invention.

FIG. 11 is a timing diagram illustrating a phase pulse in accordance with the present invention.

FIG. 12 is a timing diagram illustrating a leading edge gate in accordance with the present invention.

FIG. 13 is a timing diagram illustrating a trailing edge gate in accordance with the present invention.

FIG. 14 is a timing diagram illustrating a combined leading and trailing edge gate in accordance with the present invention.

FIG. 15 is a timing diagram illustrating a combined leading and trailing edge gated phase pulse in accordance with the present invention.

DESCRIPTION OF A PREFERRED EMBODIMENT

Figure 1:
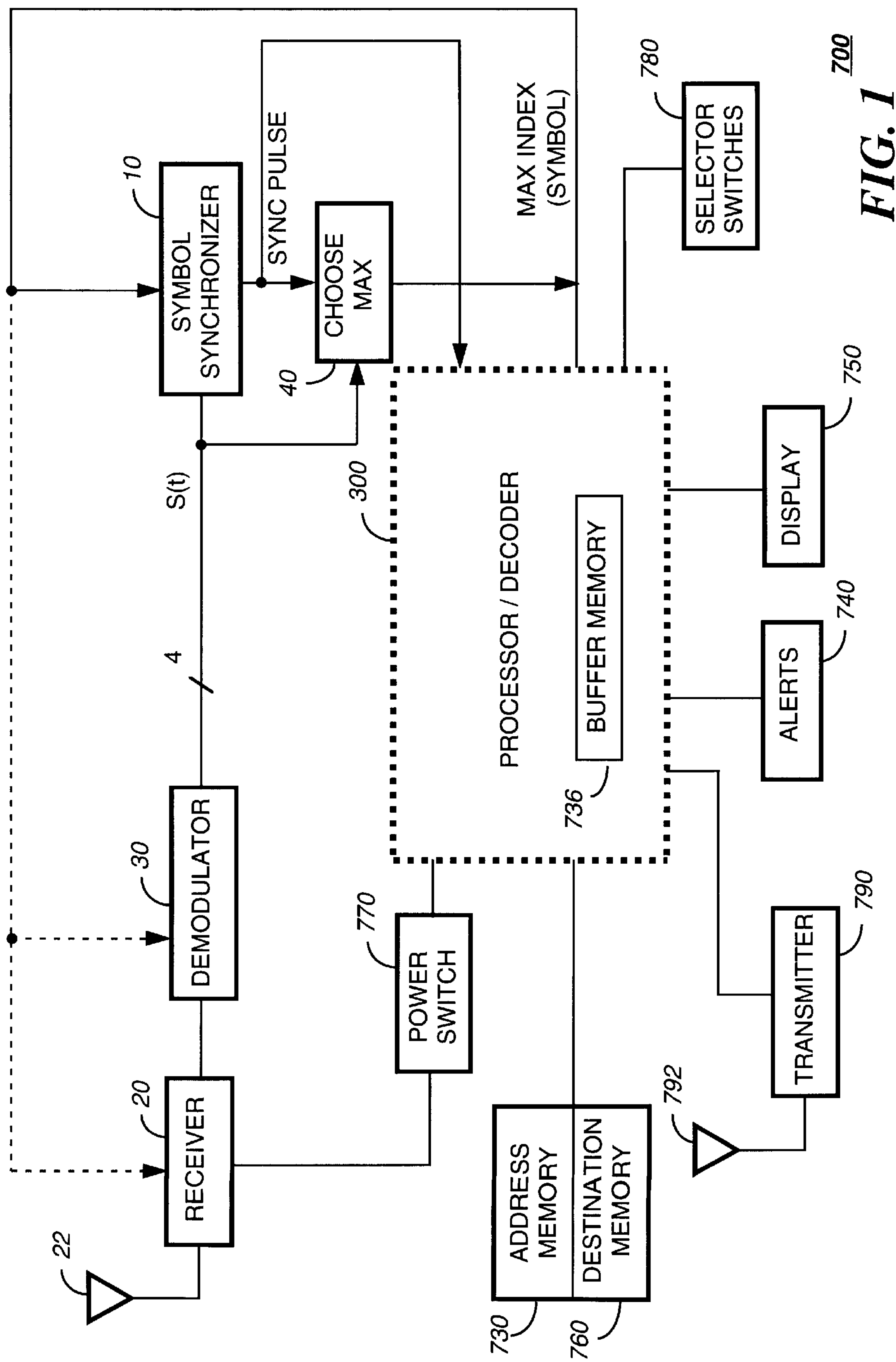
FIG. 1 is a block diagram of a selective call receiver including an accurate synchronization device with symbol decision feedback in accordance with the present invention.

FIG. 1 illustrates a selective call receiver (such as a pager) 700 utilizing a circuit for providing accurate synchronization using symbol decision feedback that preferably comprises a symbol synchronizer 10 and a maximum likelihood detector 50 (see FIG. 2) which essentially comprises a demodulator or detector or correlator 30 (that may have multiple correlators for multi-level symbols, (4 levels indicated in FIG. 1)) and a correlator selector 40 that chooses a correlator having the maximum phase value. The selective call receiver 700 further comprises a processor 300 that controls many of the functions required in a selective call receiver such as decoding. It should be understood that the functions of synchronizing and decoding could be achieved through the use of the processor or respective stand-alone sychronizer and decoder circuits without the use of the processor 300.

The selective call receiver 700 preferably comprises a receiver 20 for receiving RF signals detected by antenna 22. The received signal output by the receiver 20 is connected to the detector or demodulator (or correlator) 30. The demodulator 30 outputs the demodulated signal to the a symbol synchronizer 10 and the correlator selector 40. The symbol synchronizer 10 issues sync pulses to control when the correlator selector 40 selects the corresponding correlator having the maximum phase to provide a maximum index as will be further explained with reference to FIG. 2. The symbol synchronizer 10 is also coupled to the processor 300.

The processor 300 is a controller which may include a decoder function that is preferably coupled to the correlator selector 40 and decodes the digital data in accordance with protocol rules established for example, by Motorola's FLEX™ paging protocol. For example, the decoder outputs corresponding address information, message information and/or control information. The processor 300 preferably incorporates the decoder function and is the control point for the selective call receiver 700. Among other things, the processor 300 may control the receiver 20, demodulator 30 and the symbol synchronizer 10. The processor 300 compares received address information with predetermined addresses stored in the address memory 730 in order to trigger one of the alerts 740 or to display a received text or graphics message on display 750. In addition, messages are stored in a destination memory 760. The processor 300 may also include buffer memory 736 for storing previous symbol decisions or phase values as will be explained in further detail with respect to FIG. 2. The processor 300 also is connected to a power switch 770 to shut down the receiver 20 and other components of the selective call receiver during periods of time when the particular selective call receiver is not expected to receive information. A user interface to the selective call receiver 700 is achieved through selector switches 780. The selective call receiver may also have acknowledge-back or reverse channel transmitting capability, and accordingly may comprise a transmitter 790 and a transmitting antenna 792.

The series of equations and algorithms used in the processor 300 above can be implemented in many ways, such as by hardware circuits, a digital signal processor, computer software, microprocessor instructions, etc. Those with ordinary skill in the art will appreciate that other methods, in addition to those mentioned, are equally suitable. All or some of the circuits shown as part of selective call receiver including the processor 300 can be integrated onto a single application specific integrated circuit (ASIC), together with other signal processing functionalities.

Figure 2:
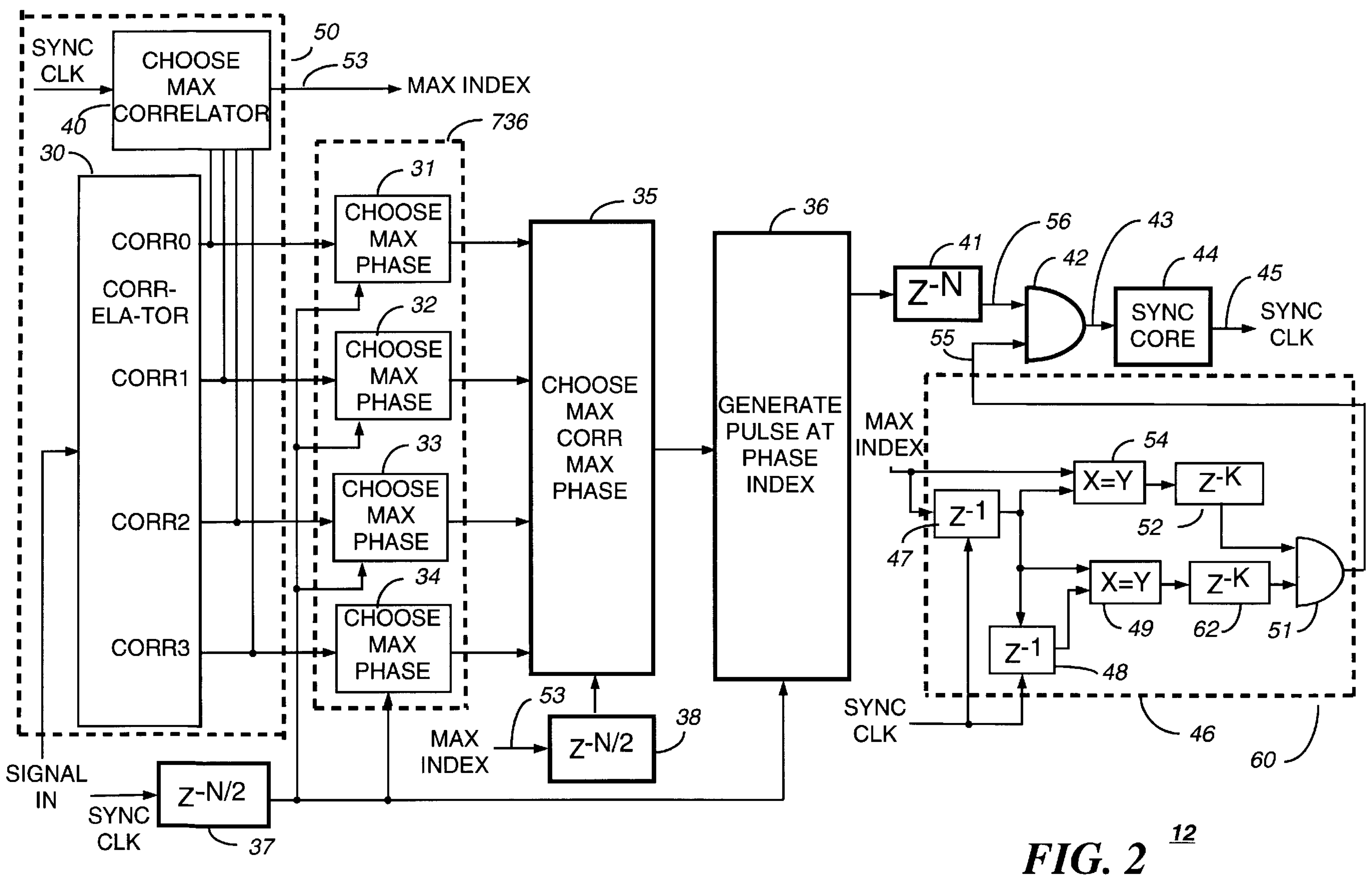
FIG. 2 is a block diagram of a synchronizer and detector in accordance with the present invention.

FIG. 2 shows the detailed block diagram of a circuit 12 for symbol decision directed feedback synchronization. The circuit 12 preferably comprises a current synchonization clock 45 that provides an initial sampling point and selects a detector corresponding to a current symbol decision, a plurality of detectors 30 including the detector corresponding to the current symbol decision and a buffer 736 (see FIGS. 1 & 2) for storing the output of the detector corresponding to the current symbol decision. The buffer could also be embodied by tapped delay lines 31, 32, 33, and 34 that provides corresponding sliding vector outputs into a vector switch embodied by device 35. The detectors 30 are preferably a series of correlators corresponding to a multi-level symbol signal. It should also be understood that the detectors 30 could be substituted with Maximum Likelihood detectors, matched filters or Fast Fourier Transform filters. The circuit 12 also preferably comprises a processor or function (35, 36, 37 and 38) for seeking within a predetermined window about the initial sampling point for an optimum phase value to provide an adjustment signal, wherein the processor further adjusts a subsequent symbol's sychronization clock in accordance with the adjustment signal to provide an optimal sampling point.

In other words, circuit 12 of FIG. 2 essentially shows a block diagram of a decision directed feedback synchronization (DDFS) system with a running correlator detector 50. The running correlator detector 50 provides 4 outputs which identify the amount of correlation achieved between the input signal and each of the 4 known signals at each of the oversampling phases/instances. Ideally, one of the oversampling phases provides the optimum point in which to make the decision among the 4 correlation outputs. The outputs of the 4 correlators (CORR0, CORR1, CORR2 and CORR3) and the symbol decision 53 (MAX INDEX) based on these outputs is shown in FIG. 2. FIGS. 4–15 show all of the various signals described in the following paragraphs.

The circuit 12 preferably uses the 4 correlator outputs along with MAX INDEX (the output of which can be seen in the timing diagram of FIG. 8) to determine the best sampling instance. Each of the 4 correlator outputs are fed to a tapped delay line (31, 32 , 33 and 34 of buffer 736) to produce 4 corresponding sliding vector outputs which can be seen in FIGS. 4–7. The length of these vectors correspond to a symbol time duration. The peak of one of the sliding vector outputs represents the proper sampling phase. Each of the sliding vector outputs are input to a vector switch 35. One half a symbol time after the SYNC CLK samples the symbol decision block (max/min finder) the sliding vector corresponding to MAX INDEX is clocked (as represented by functions 37 & 38) to the output of the vector switch 35. Sampling this vector 0.5 symbol time later helps to center the peak correlation within the vector and eliminate multiple peak correlation pulses within an average symbol time. At the same 0.5 symbol time later (as represented by function 37) the clocked vector is fed to a phase decision block 36 (maxima finder) that generates a pulse at the phase corresponding to the maximum correlation for the symbol decision determined. If the the sampling cycle of the present invention were 24 samples per cycle for each symbol time, then the phase pulse at block 36 is preferably delayed by 24 samples (a full symbol time) as indicated by function 41 to provide the phase pulse signal 56 which is given as an input to a logical AND gate 42. FIGS. 9 and 10 illustrate a timing diagram for the SYNC CLK and the SYNC CLK delayed by half a symbol respectively.

At the other input to the logic gate 42 is the repeat symbol signal 55 which is used to gate the phase pulse signal 56. A timing diagram of the phase pulse signal 56 is shown in FIG. 11. The repeat symbol signal 55 is used to defeat pulses sent to a sync core block 44 when the current symbol decision is a member of a series of repeated symbols. In other words, the updates in the phase pulse signal 56 are ignored by the sync core block 44 when there is a repeat symbol signal. This is done because the correlation output for that symbol could occur at the peak value for any sampling instance (due to noise) within a symbol duration thereby confusing the phase decision block which would result in unwanted SYNC clock jitter. The repeat symbol signal 55 is preferably generated by a circuit 60 which comprises a repeated symbol blocking circuit as shown having a leading edge branch and a trailing edge branch. The leading edge branch preferably comprises a symbol delay block 47 that is gated by the SYNC CLK as shown. The symbol delay block 47 provides a representation of MAX INDEX delayed by one symbol with respect to the SYNC clock gating. The output from delay block 47 is compared with the current MAX INDEX symbol at comparator 54. If the current symbol and the delayed symbol are equal, then the output of the comparator goes low. The output of the comparator 54 is preferably delayed by "K" samples (preferably half a symbol time or 12 samples) as represented by block 52 to ensure a leading edge gate that would encompass the expected phase pulses.

The trailing edge branch preferably comprises not only the symbol delay block 47, but the symbol delay block 48 wherein both delay blocks are gated by the SYNC CLK as shown. As previously explained, the symbol delay block 47 provides a representation of MAX INDEX delayed by one symbol with respect to the SYNC clock gating. The symbol delay block 48 along with symbol delay block 47 provides a representation of MAX INDEX delayed by two symbols with respect to the SYNC clock gating. The output from delay block 47 is compared with the output from delay block 48 at comparator 49. If the 1 symbol time delayed symbol from block 47 equals the two symbol time delayed symbol output from block 48, then the output of the comparator 49 goes low. The output of the comparator 49 is also preferably delayed by "K" samples (preferably half a symbol time or 12 samples) as represented by block 62 to ensure a trailing edge gate that would encompass the expected phase pulses.

The delayed output of comparator 54 as represented by the timing diagram of FIG. 12 serves as a first input to the logic AND gate 51. The delayed output of the comparator 49 as represented by the timing diagram of FIG. 13 serves as the second input to the logic AND gate 51. Thus, the output of the logic AND gate 51 (as represented by the timing diagram of FIG. 14) when either comparator 54 or 49 goes low (wherein the current symbol matches an immediate prior symbol or an immediate prior symbol matches the next immediate prior symbol), then repeat symbol 55 will go low and subsequently gate the phase pulse signal 56 at the AND gate 42. The gated phase pulse signal 43 is illustrated by the timing diagram of FIG. 15.

The output of the logic gate 42 provides the GATED PHASE PULSE 43 which is then sent to the SYNC CORE block 44. The SYNC CORE block 44 is used to control the loop bandwidth (adaptation rate) of the synchronizer. It also generates a SYNC CLK 45 at average periodic intervals even when no pulses are sent by the pulse decision block 36. This is especially important in light of the REPEAT SYMBOL input 55 to the AND gate 42 which gates the PHASE PULSE signal 56.

Figure 3:
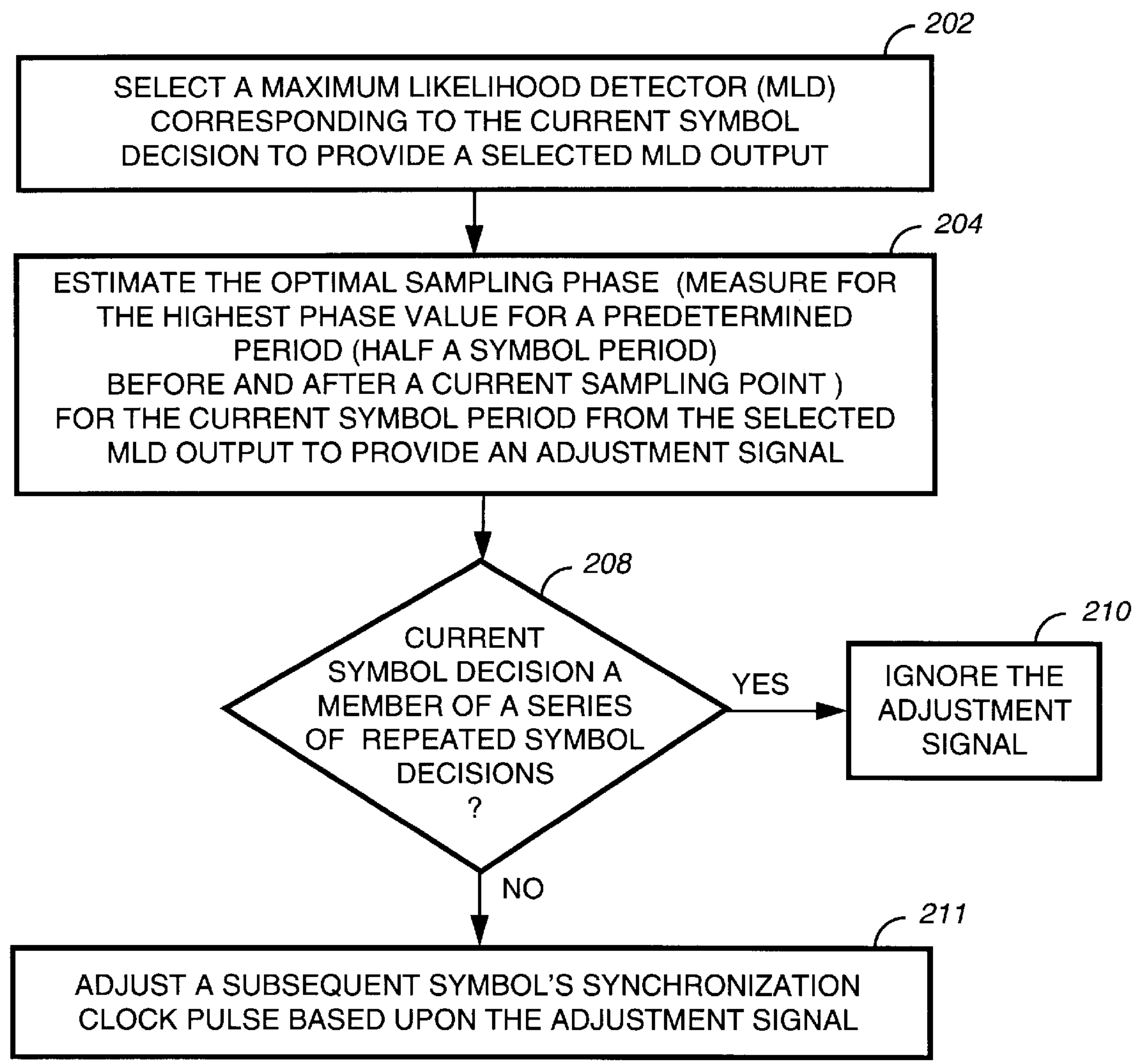
FIG. 3 is a flow chart illustrating a method for accurately synchronizing using symbol decision feedback in accordance with the present invention.
Figure 4:
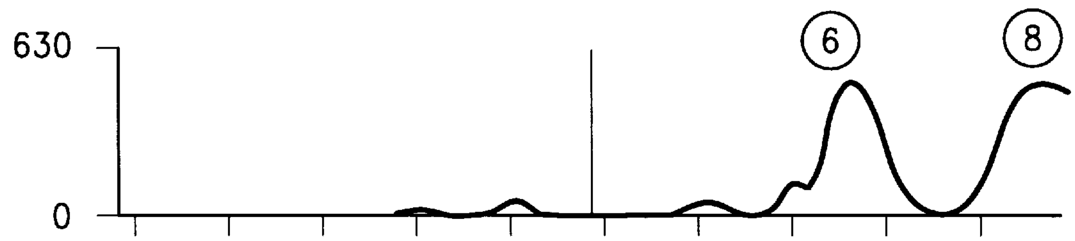
FIG. 4 is a timing diagram illustrating an output from a first correlator in accordance with the present invention.
Figure 5:
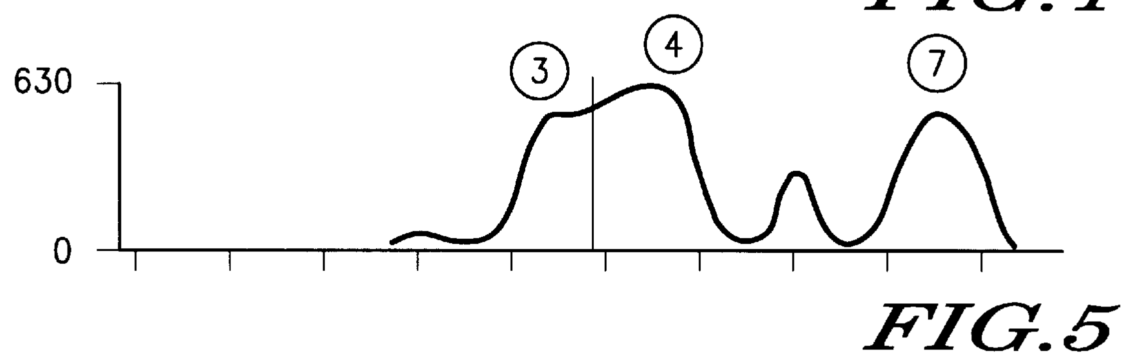
FIG. 5 is a timing diagram illustrating an output from a second correlator in accordance with the present invention.
Figure 6:
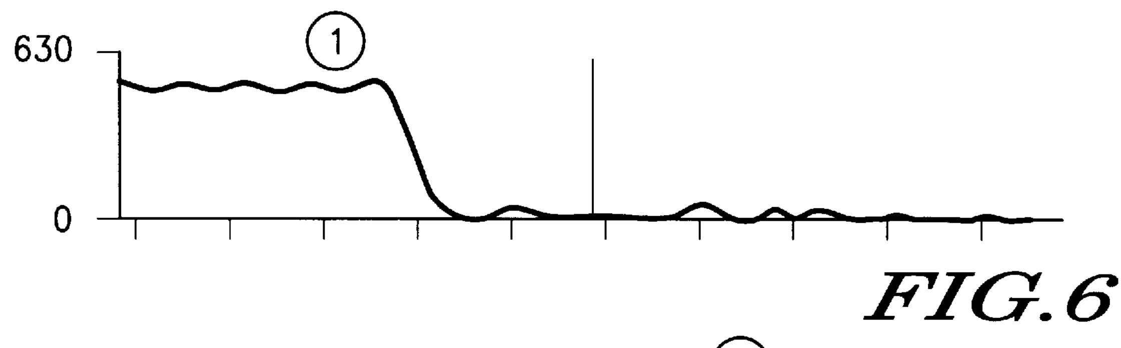
FIG. 6 is a timing diagram illustrating an output from a third correlator in accordance with the present invention.
Figure 7:
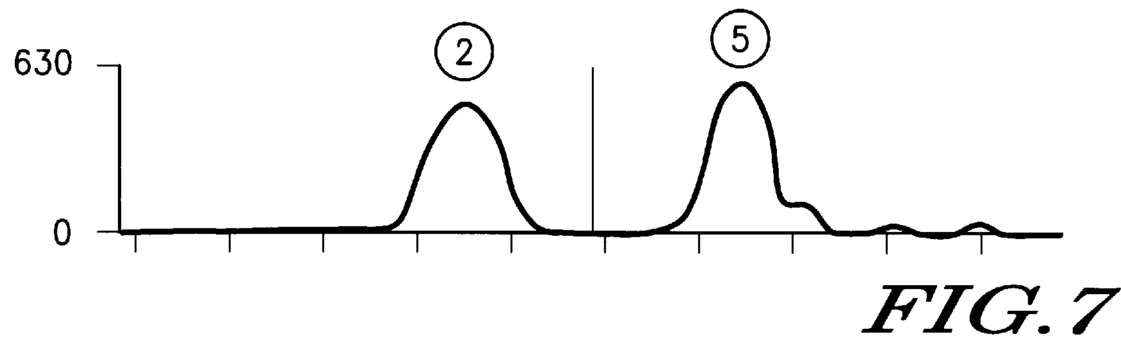
FIG. 7 is a timing diagram illustrating an output from a fourth correlator in accordance with the present invention.
Figure 8:
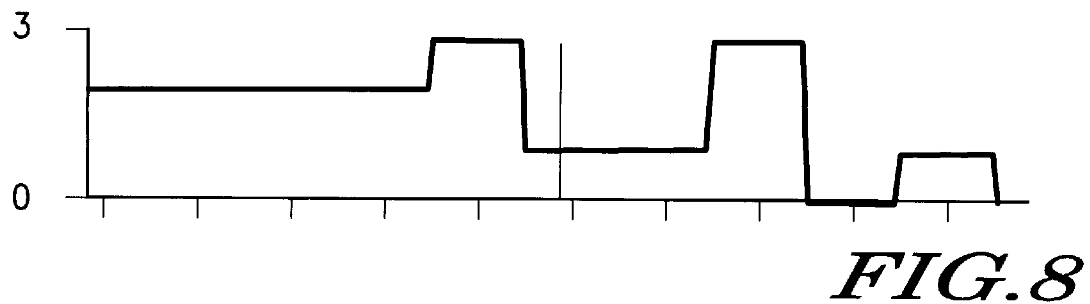
FIG. 8 is a timing diagram illustrating the symbol decision (MAX INDEX) in accordance with the present invention.

Referring to FIG. 3, a flow chart illustrating a method 200 for accurately synchronizing using symbol decision feedback at a selective call receiver is shown. At step 202, a correlator is preferably selected by a maximum likelihood detector (MLD) which has the maximum phase value corresponding to the current symbol decision. At step 204, the optimal sampling phase is estimated for the current symbol period from the selected MLD output to provide an adjustment signal. Preferably, the highest phase value is measured for a predetermined period (preferably half a symbol period) before and after the current sampling point. At decision block 208, if the current symbol decision is a member of a series of repeated symbols, then the sychronizer should ignore the adjustment signal. If the current symbol decision is different than the previous symbol decision, then at step 211 the subsequent symbol's synchronization clock pulse is adjusted based upon the adjustment signal.

The above description is intended by way of example only and is not intended to limit the present invention in any way except as set forth in the following claims.

What is claimed is:

1. A method for accurate synchronization using symbol decision feedback on a symbol by symbol basis by determining an optimal sampling phase using a current symbol decision in a circuit having a plurality of correlators, comprising the steps of:

selecting the correlator output corresponding to the current symbol decision during the current symbol period generated by a current synchronization clock providing the selected correlator output;

estimating the optimal sampling phase of the current symbol period from the selected correlator output to provide an adjustment signal;

adjusting a subsequent symbol's synchronization clock pulse based upon the adjustment signal.

2. The method of claim 1, wherein the step of estimating the optimal sampling phase comprises the step of measuring for the highest phase value for a predetermined time period before and after a current sampling point.

3. The method of claim 2, wherein the predetermined time period is half a symbol period.

4. The method of claim 1, wherein the adjustment signal to the synchronization clock pulse is ignored when at the time of the adjustment the current symbol decision is the same as a previous symbol decision.

5. The method of claim 1, wherein the adjustment signal to the synchronization clock pulse is ignored when at the time of the adjustment the current symbol decision is different than n number of previous repeated symbol decisions.

6. The method of claim 1, wherein the adjustment signal to the synchronization clock pulse is ignored when at the time of the adjustment the current symbol decision is a member of a series of repeated symbols.

7. A circuit for symbol decision directed feedback synchronization, comprising:

a current synchonization clock that provides an initial sampling point and selects a detector corresponding to a current symbol decision;

a plurality of detectors including the detector corresponding to the current symbol decision;

a buffer for storing the output of the detector corresponding to the current symbol decision; and a processor for seeking within a predetermined window about the initial sampling point for an optimum phase value to provide an adjustment signal during the current symbol period, wherein the processor further adjusts a subsequent symbol's sychronization clock in accordance with the adjustment signal to provide an optimal sampling point.

8. The circuit of claim 7, wherein the plurality of detectors comprise correlators.

9. The circuit of claim 7, wherein the plurality of detectors comprise Maximum Likelihood detectors.

10. The circuit of claim 7, wherein the plurality of detectors comprise matched filters.

11. The circuit of claim 7, wherein the plurality of detectors comprise Fast Fourier Transform filters.

12. The circuit of claim 7, wherein the buffer comprises a tapped delay line that provides corresponding sliding vector outputs into a vector switch.

13. A selective call receiver unit capable of receiving synchronous signals, comprising:

a selective call receiver;

a demodulator coupled to the selective call receiver; and a circuit coupled to the demodulator for symbol decision directed feedback synchronization, comprising:

an current synchonization clock that provides an initial sampling point and selects a detector corresponding to a current symbol decision;

a plurality of detectors including the detector corresponding to the current symbol decision;

a buffer for storing the output of the detector corresponding to the current symbol decision; and a processor for seeking within a predetermined window about the initial sampling point for an optimum phase value to provide an adjustment signal during the current symbol period, wherein the processor further adjusts a subsequent symbol's sychronization clock in accordance with the adjustment signal to provide an optimal sampling point.

14. The circuit of claim 13, wherein the plurality of detectors comprise correlators.

15. The circuit of claim 13, wherein the plurality of detectors comprise Maximum Likelihood detectors.

16. The circuit of claim 13, wherein the plurality of detectors comprise matched filters.

17. The circuit of claim 13, wherein the plurality of detectors comprise Fast Fourier Transform filters.

18. The circuit of claim 13, wherein the buffer comprises a tapped delay line that provides corresponding sliding vector outputs into a vector switch.

* * * * *